United States Patent
Sugawara

(10) Patent No.: US 10,725,313 B2
(45) Date of Patent: Jul. 28, 2020

(54) LENS DRIVING DEVICE, CAMERA MODULE AND CAMERA MOUNTING DEVICE HAVING SHAKE-CORRECTING FUNCTION AND AUTO-FOCUSING FUNCTION

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 154 days.

(21) Appl. No.: 15/777,712

(22) PCT Filed: Nov. 20, 2015

(86) PCT No.: PCT/CN2015/095148
§ 371 (c)(1),
(2) Date: May 21, 2018

(87) PCT Pub. No.: WO2017/084090
PCT Pub. Date: May 26, 2017

(65) Prior Publication Data
US 2018/0348538 A1 Dec. 6, 2018

(51) Int. Cl.
*G02B 27/64* (2006.01)
*G03B 13/36* (2006.01)
(Continued)

(52) U.S. Cl.
CPC ........... *G02B 27/646* (2013.01); *G02B 7/021* (2013.01); *G03B 5/06* (2013.01); *G03B 13/36* (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS

| | | | |
|---|---|---|---|
| 7,161,621 B2 * | 1/2007 | Kai | ........................ G03B 17/48 250/239 |
| 8,731,390 B2 * | 5/2014 | Goldenberg | ............. G03B 3/10 335/219 |

(Continued)

FOREIGN PATENT DOCUMENTS

| JP | 2011085666 A | 4/2011 |
|---|---|---|
| JP | 2013-024938 A | 2/2013 |

(Continued)

OTHER PUBLICATIONS

International Search Report from International Application No. PCT/CN2015/095148 dated Aug. 19, 2016.

*Primary Examiner* — Arnel C Lavarias
(74) *Attorney, Agent, or Firm* — Brundidge & Stanger, P.C.

(57) ABSTRACT

The lens driving device is provided with a driving unit for OIS, using a driving force of a first voice coil motor to enable an OIS movable unit to swing in a plane orthogonal to the optical axis direction with respect to an OIS fixed unit; a driving unit for AF, using the driving force of a second voice coil motor to enable an AF movable unit to move along the optical axis direction with respect to an AF fixed unit; a supporting unit for OIS, formed of a first elastomeric material, and having a first biaxial hinge structure moveably supporting the OIS movable unit in the plane orthogonal to the optical axis direction; and a supporting unit for AF, formed of a second elastomeric material, and having a (Continued)

second biaxial hinge structure moveably supporting the AF movable unit along the optical axis direction.

9 Claims, 15 Drawing Sheets

(51) Int. Cl.
| | |
|---|---|
| *H02K 41/035* | (2006.01) |
| *H04N 5/225* | (2006.01) |
| *G02B 7/02* | (2006.01) |
| *G03B 5/06* | (2006.01) |
| *H04N 5/232* | (2006.01) |

(52) U.S. Cl.
CPC ....... *H02K 41/0356* (2013.01); *H04N 5/2254* (2013.01); *H04N 5/2257* (2013.01); *H04N 5/23287* (2013.01); *G03B 2205/0023* (2013.01); *G03B 2205/0069* (2013.01); *H04N 5/23212* (2013.01)

(58) Field of Classification Search
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 9,143,690 B2* | 9/2015 | Hu | G02B 27/646 |
| 2013/0016427 A1 | 1/2013 | Sugawara | |
| 2015/0281587 A1 | 10/2015 | Furuta et al. | |
| 2016/0349596 A1* | 12/2016 | Yamaji | G02B 27/646 |
| 2017/0131561 A1* | 5/2017 | Jung | H04N 5/2254 |
| 2018/0113322 A1* | 4/2018 | Sugawara | G02B 7/08 |
| 2019/0294026 A1* | 9/2019 | Sugawara | G02B 7/09 |

FOREIGN PATENT DOCUMENTS

| | | |
|---|---|---|
| JP | 2014178452 A | 9/2014 |
| JP | 2015195569 A | 11/2015 |

\* cited by examiner

LENS DRIVING DEVICE, CAMERA MODULE AND CAMERA MOUNTING DEVICE HAVING SHAKE-CORRECTING FUNCTION AND AUTO-FOCUSING FUNCTION

TECHNICAL FIELD

The present invention relates to a shake-correcting lens driving device, a camera module having a shake-correcting function, and a camera mounting device.

BACKGROUND ART

In general, a small-sized camera module is mounted in a mobile terminal such as a smartphone. In such a camera module, a lens driving device is employed (for example, PTL 1). The lens driving device has an auto-focusing function of automatically performing focusing for capturing a subject (hereinafter referred to as "AF (Auto Focus) function"), and a shake-correcting function (hereinafter referred to as "OIS (Optical Image Stabilization) function") of optically correcting shake (vibration) upon capturing an image to reduce the irregularities of the image.

A lens driving device having the auto-focusing function and the shake-correcting function includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed at a periphery of the lens part, an auto-focusing magnet part (hereinafter referred to as "AF magnet part") separated from the AF coil part in the radial direction, and an elastic supporting part (for example, a leaf spring) configured to elastically support an auto-focusing movable part (hereinafter referred to as "AF movable part") including the lens part and the AF coil part with respect to an auto-focusing fixing part (hereinafter referred to as "AF fixing part") including the AF magnet part for example. Automatic focusing is performed by moving the AF movable part in the light axis direction with respect to the AF fixing part by utilizing a driving force of a voice coil motor composed of the AF coil part and the AF magnet part. It is to be noted that the AF fixing part may include the AF coil part, and the AF movable part may include the AF magnet part.

The OIS driving part includes, for example, a shake-correcting magnet part (hereinafter referred to as "OIS magnet part") disposed in the AF driving part, a shake-correcting coil part (hereinafter referred to as "OIS coil part") separated from the OIS magnet part, and a supporting part configured to support a shake-correcting movable part (hereinafter referred to as "OIS movable part") including the AF driving part and the OIS magnet part with respect to a shake-correcting fixing part (hereinafter referred to as "OIS fixing part") including the OIS coil part. Shake correction is performed by swaying the OIS movable part in a plane orthogonal to the light axis direction with respect to the OIS fixation part by utilizing a driving force of a voice coil motor composed of the OIS magnet part and the OIS coil part (so-called barrel shift system). The OIS magnet part can also serve as the AF magnet part, and with such a configuration, the size and the height of the lens driving device can be reduced. In addition, a suspension wire is employed as a supporting part for supporting the OIS movable part with respect to the OIS fixing part, for example.

CITATION LIST

Patent Literature

PTL 1
Japanese Patent Application Laid-Open No. 2013-24938

SUMMARY OF INVENTION

Technical Problem

Preferably, the diameter of the suspension wire is small in view of increasing the sensitivity of the OIS driving part (hereinafter referred to as "OIS sensitivity"). When the diameter of the suspension wire is small, however, the risk of rupture with an impact of dropping or the like is high. In addition, since the suspension wire is easily deflected in this case, the OIS movable part cannot be translated (the lens part is tilted), and the tilt characteristics in shake correction are degraded. The tilt characteristics represent the parallelism of the OIS movable part in shake correction, and the tilt characteristics are represented by the inclination angle of the OIS movable part in movement of the lens part. In this manner, when the diameter of the suspension wire is reduced to increase the OIS sensitivity, the reliability of lens driving device is sacrificed.

In addition, in the conventional AF driving part, the AF movable part is sandwiched by a leaf spring, and as such the structure is complicated with a large number of components, and complex assembly work is required.

An object of the present invention is to provide a lens driving device, and a camera module and a camera mounting apparatus including the lens driving device which can provide improved OIS sensitivity and high reliability, and can simplify the assembly work.

Solution to Problem

A lens driving device according an embodiment of the present invention includes a shake-correcting driving part including: a shake-correcting magnet part disposed at a periphery of a lens part; a shake-correcting coil part disposed separately from the shake-correcting magnet part; and a shake-correcting supporting part configured to support a shake-correcting movable part including the shake-correcting magnet part with respect to a shake-correcting fixing part including the shake-correcting coil part in a state where the shake-correcting movable part is separated from the shake-correcting fixing part in a light axis direction. The shake-correcting driving part performs shake correction by swaying the shake-correcting movable part with respect to the shake-correcting fixing part in a plane orthogonal to the light axis direction by use of a driving force of a voice coil motor including the shake-correcting coil part and the shake-correcting magnet part. The shake-correcting supporting part is made of an elastomer material, and has a biaxial hinge structure for supporting the shake-correcting movable part such that the shake-correcting movable part is movable in the plane orthogonal to the light axis direction. The shake-correcting movable part includes an auto-focusing driving part, the auto-focusing driving part including: an auto-focusing coil part disposed at a periphery of the lens part, an auto-focusing magnet part disposed separately from the auto-focusing coil part in a radial direction, and an auto-focusing supporting part configured to support an auto-focusing movable part including the auto-focusing coil part with respect to an auto-focusing fixing part including the auto-focusing magnet part. The auto-focusing driving part performs automatic focusing by moving the auto-focusing movable part in the light axis direction with respect to the auto-focusing fixing part by use of a driving force of a voice coil motor including the auto-focusing coil part and the auto-focusing magnet part. The auto-focusing supporting part is made of an elastomer material, and has a biaxial hinge structure for supporting the auto-focusing movable part such that the auto-focusing movable part is movable in the light axis direction.

A camera module according an embodiment of the present invention includes: the lens part; and the above-mentioned lens driving device.

A camera mounting apparatus according an embodiment of the present invention is an information apparatus or a transport apparatus. The camera mounting apparatus includes the above-mentioned camera module.

Advantageous Effects of Invention

According to the present invention, the risk of damaging of the shake-correcting supporting part and/or the auto-focusing supporting part due to dropping impact or the like is remarkably low. In addition, the structure is simple in comparison with conventional structures, and the number of the components is small. Accordingly, high reliability can be ensured, and the OIS sensitivity can be increased, while simplifying the assembly work.

DESCRIPTION OF EMBODIMENT

Figure 1A:
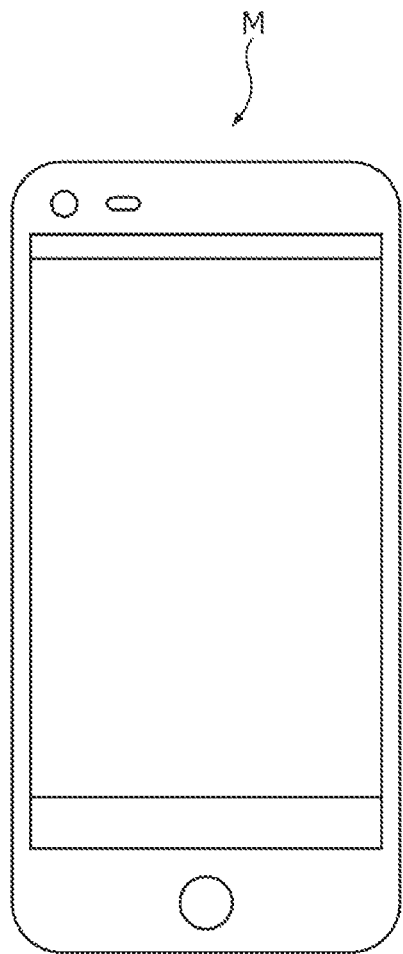
FIGS. 1A and 1B illustrate a smartphone in which a camera module according to an embodiment of the present invention is mounted.
Figure 1B:
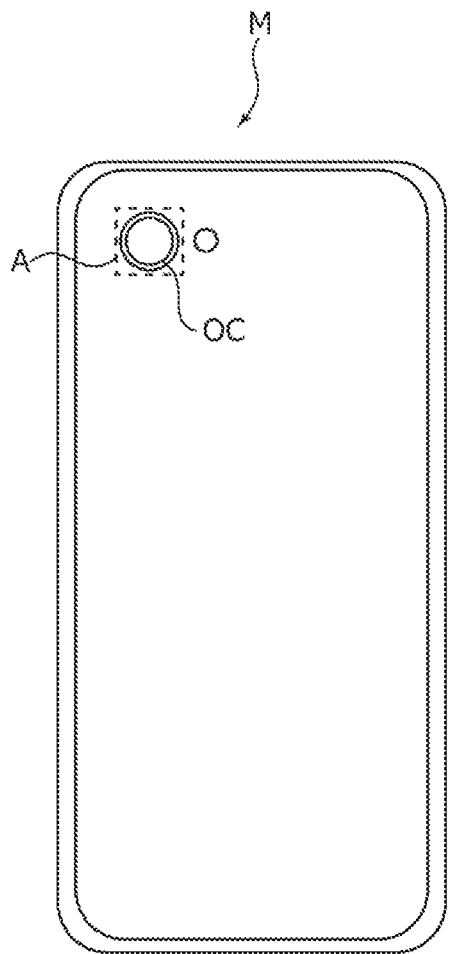

In the following, an embodiment of the present invention is described in detail with reference to the drawings. FIGS. 1A and 1B illustrate smartphone M (camera mounting device) in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto-focusing function and a shake-correcting function, and captures an image without image blurring by automatically performing focusing at the time of capturing a subject and by correcting shake (vibration) at the time of capturing an image.

Figure 2:
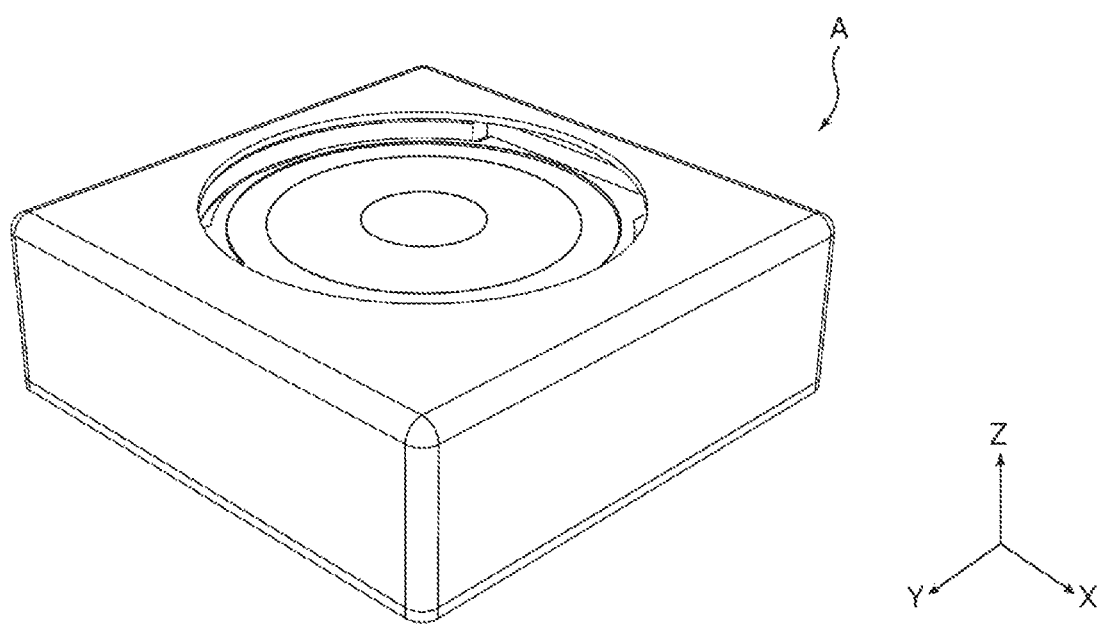
FIG. 2 is a perspective view of an external appearance of the camera module.
Figure 3:
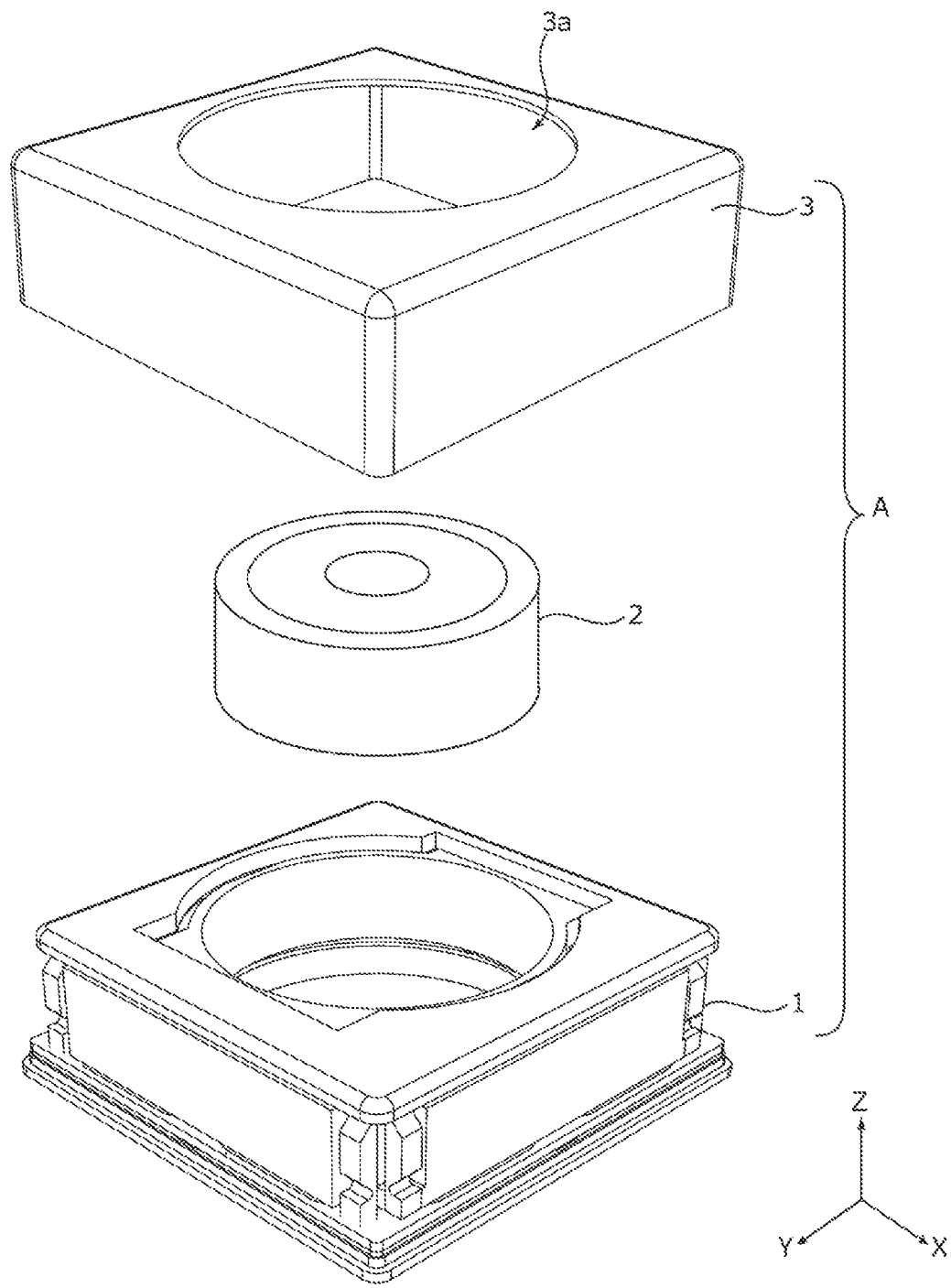
FIG. 3 is an exploded perspective view of the camera module.

FIG. 2 is a perspective view of an external appearance of camera module A. FIG. 3 is an exploded perspective view of camera module A. As illustrated in FIGS. 2 and 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the image capturing side in the light axis direction (also referred to as "infinity position side"). In addition, the X direction and the Y direction orthogonal to the light axis direction are referred to as "light axis orthogonal direction."

Camera module A includes lens part 2 in which a lens is housed in a lens barrel having a cylindrical shape, AF and OIS lens driving device 1, an image capturing part (not illustrated) that captures a subject image imaged with lens part 2, cover 3 that covers the entirety, and the like.

As viewed in the light axis direction, cover 3 is a capped square cylindrical body having a square shape in plan view. Circular opening 3a is formed in the top surface of shield cover 2. Circular opening 3a is formed in the top surface of shield cover 2. Lens part 2 is exposed to the outside through opening 3a. Cover 3 is fixed to base 23 of OIS fixing part 20 (see FIG. 5) of lens driving device 1. It is to be noted that cover 3 may be made of a conductive material, and may be grounded through OIS fixing part 20.

The image capturing part (not illustrated) includes an image capturing device (not illustrated), and is disposed on the image capturing side in the light axis direction of lens driving device 1, that is, the image capturing side in the light axis direction of OIS fixing part 20. The imaging device (not illustrated) is composed of, for example, a CCD (charge coupled device) image sensor, a CMOS (complementary metal oxide semiconductor) image sensor, or the like. The image capturing device (not illustrated) captures a subject image imaged with lens part 2.

Figures 4A, 4B:
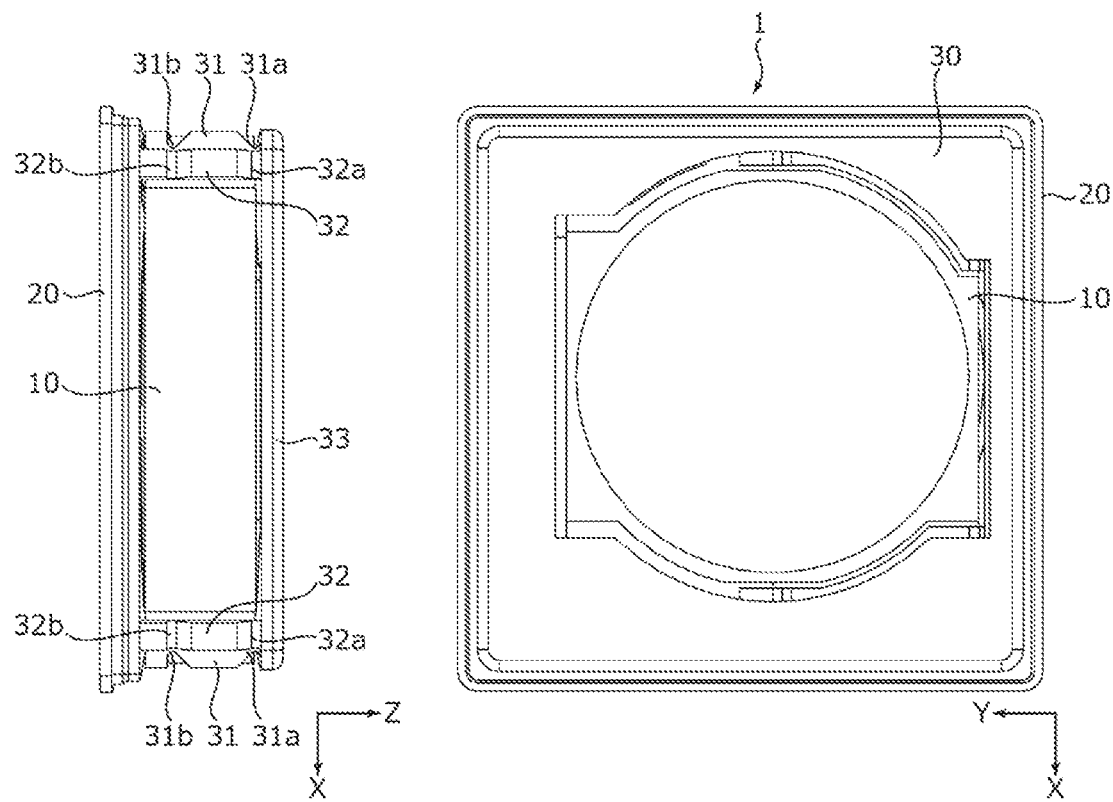
FIGS. 4A to 4C illustrate a lens driving device as viewed from three sides.
Figure 4C:
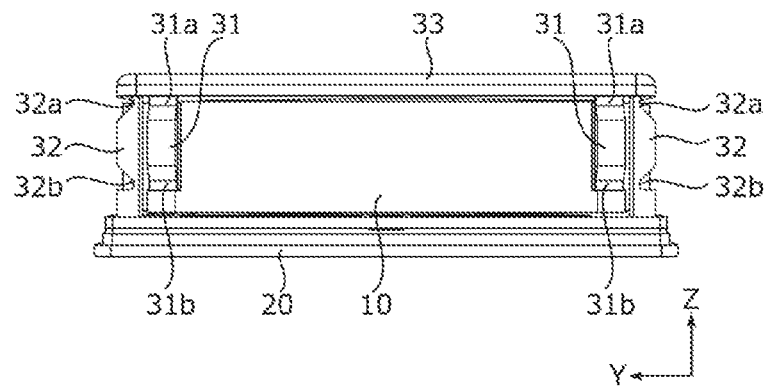
Figure 5:
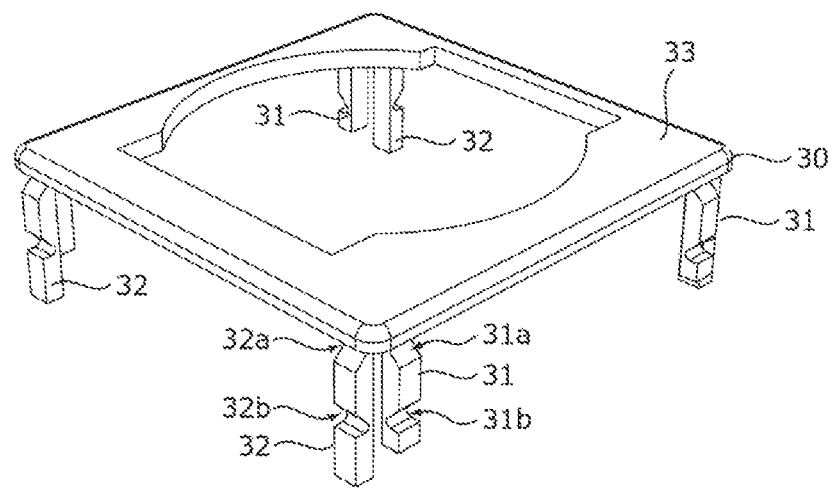
FIG. 5 is an exploded perspective view of the lens driving device.
Figure 5:
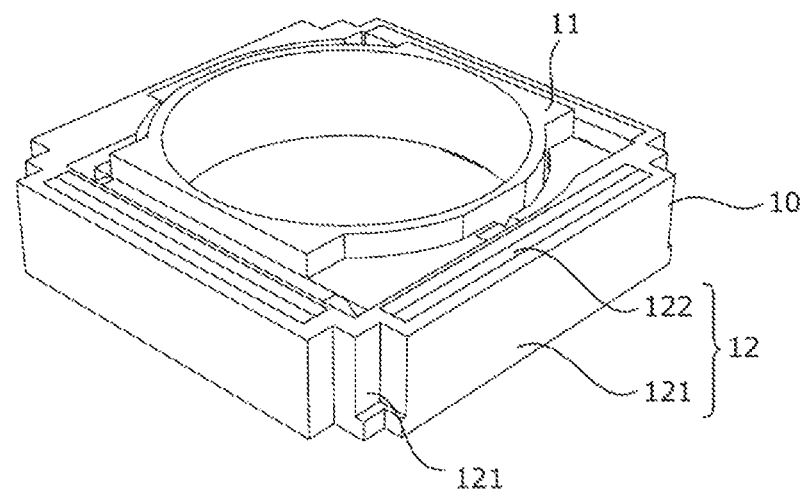
Figure 5:
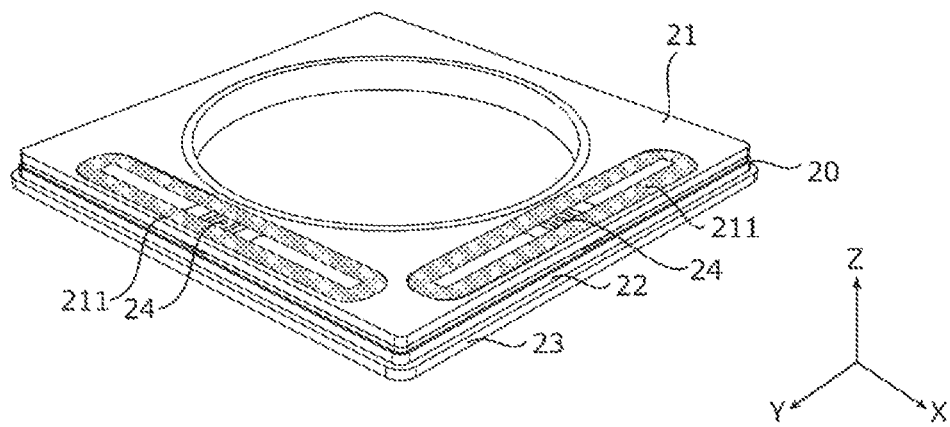

FIGS. 4A to 4C illustrate the lens driving device as viewed from three sides. FIG. 4A is a plan view, FIG. 4B is a left view, and FIG. 4C is a front view. FIG. 5 is an exploded perspective view of lens driving device 1. As illustrated in FIGS. 4A to 5, lens driving device 1 includes OIS movable part 10, OIS fixing part 20, and OIS supporting part 30 and the like.

OIS movable part 10 includes an OIS magnet part serving as a component of an OIS voice coil motor, and sways in the plane orthogonal to the light axis at the time of shake correction. OIS fixing part 20 includes an OIS coil part serving as a component of the OIS voice coil motor, and supports OIS movable part 10 with OIS supporting part 30. That is, the OIS lens driving part of lens driving device 1 is of a moving magnet type. OIS movable part 10 includes an AF driving part. OIS movable part 10 is separated from OIS fixing part 20 such that OIS movable part 10 can move in the plane orthogonal to the light axis direction. Here, OIS movable part 10 is disposed on the light reception side relative to OIS fixing part 20 in the light axis direction, and separated from OIS fixing part 20.

OIS supporting part 30 couples OIS fixing part 20 and OIS movable part 10. In the present embodiment, OIS supporting part 30 is composed of a linking member made of an elastomer material (hereinafter referred to as "OIS linking member 30"), not a conventional suspension wire. An elastomer is a rubber elastic material, and includes a heat curable elastomer (rubber) and a thermoplastic elastomer (elastic plastic).

As illustrated in FIGS. 4A to 5, OIS linking member 30 includes upper frame body 33, first side supporting member 31, and second side supporting member 32. It is to be noted that first side supporting member 31 and second side supporting member are described as "side supporting members 31 and 32" in descriptions of their common configurations.

Upper frame member 33 is a frame member having a square shape in plan view, and is disposed opposite to base 23 of OIS fixing part 20 in the light axis direction. Upper frame member 33 is made of a material having a high rigidity. Upper frame member 33 may be made of a resin material or a metal material, and preferably, upper frame member 33 is made of a resin material in view of weight reduction. In particular, a liquid crystal polymer (LCP resin) is favorable as the material of upper frame member 33. With upper frame member 33 made of a liquid crystal polymer, lowering due to the own weight of OIS movable part 10 can be prevented, and favorable tilt characteristics can be ensured while achieving weight reduction.

Side supporting members 31 and 32 are made of an elastomer material. With this configuration, the risk of damaging of side supporting members 31 and 32 with a dropping impact or the like is much lower than the case where a suspension wire is employed as the OIS supporting part. Accordingly, high reliability can be ensured, and the OIS sensitivity of lens driving device 1 can be increased. In addition, since the primary resonance of the OIS driving part can be suppressed by utilizing the attenuation force of the elastomer, the application of the damper is unnecessary unlike the case where the suspension wire is employed, and the assembly work is simplified, and as a result, the productivity is improved.

Preferably, the elastomer material is a thermoplastic elastomer (for example, polyester elastomer) which can provide a small spring constant and can allow for injection molding and mass production. A polyester elastomer has good heat resisting characteristics and good low temperature characteristics, and can have a relatively stable flexibility even with temperature change.

Side supporting members 31 and 32 are columnar members having a strength enough to support OIS movable part 10. Two first side supporting members 31 or two second side supporting members 32 are disposed at each of the four sides of upper frame body 33. It is to be noted that side supporting members 31 and 32 may be plate-shaped members that cover the side surfaces of the OIS movable part. Side supporting members 31 and 32 have a biaxial hinge structure for bending about two axes so as to allow OIS movable part 10 to translate in the plane orthogonal to the light axis.

To be more specific, first side supporting member 31 includes two Y-hinge parts 31a and 31b that operate about the Y direction, and the thickness of Y-hinge parts 31a and 31b is smaller than that of the portions other than Y-hinge parts 31a and 31b in first side supporting member 31. Here, Y-hinge parts 31a and 31b are hinge grooves formed on the external surface of first side supporting member 31.

The shape of second side supporting member 32 is identical to that of first side supporting member 31. Specifically, second side supporting member 32 includes two X-hinge parts 32a and 32b extending in the X direction, and the thickness of X-hinge parts 32a and 32b is smaller than that of the portions other than X-hinge parts 32a and 32b in second side supporting member 32. Here, X-hinge parts 32a and 32b are hinge grooves formed on the external surface of second side supporting member 32.

Preferably, the hinge grooves of first side supporting member 31 and second side supporting member 32 have, but not limited to, an R-shape. With this configuration, the durability against repetitive bending in shake correction is improved.

First side supporting members 31 are suspended from end portions of the two sides extending along the Y direction of upper frame body 33. One end portion of first side supporting member 31 is fixed to upper frame body 33, and the other end portion of first side supporting member 31 is fixed to OIS movable part 10 (here, magnet holder 121).

Second side supporting members 32 are suspended from end portions of two sides extending along the X direction of upper frame body 33. One end portion of second side supporting member 32 is fixed to upper frame body 33, and the other end portion of second side supporting member 32 is fixed to OIS fixing part 20 (here, coil substrate 21).

Upper frame body 33 of OIS linking member 30 is supported by second side supporting member 32 over OIS fixing part 20 on the light reception side in the light axis direction. In addition, OIS movable part 10 is suspended from upper frame body 33 by first side supporting member 31.

Accordingly, when OIS movable part 10 moves in the X direction, only second side supporting members 32 are elastically deformed, and first side supporting members 31 are not elastically deformed. When OIS movable part 10 moves in the Y direction, only first side supporting members 31 are elastically deformed, and second side supporting members 32 are not elastically deformed. That is, OIS movable part 10 can selectively move in the X direction and the Y direction.

As described above, OIS supporting part 30 includes upper frame body 33 disposed opposite to OIS fixing part 20 in the light axis direction, first side supporting members 31 disposed opposite to each other in the X direction (a first direction orthogonal to the light axis direction), each of which couples upper frame body 33 and OIS movable part 10, and second side supporting members 32 disposed opposite to each other in the Y direction (a second direction orthogonal to the light axis direction and the first direction), each of which couples upper frame body 33 and OIS fixing part 20. First side supporting member 31 includes two Y-hinge parts, 31a and 31b, which are thinner than other portions in first side supporting member 31 and operate about the Y direction. First side supporting member 31 are bent such that the bending directions at Y-hinge parts 31a and 31b are opposite directions when OIS movable part 10 moves in the X direction (see FIGS. 11A and 11B). Second side supporting member 32 includes two X-hinge parts, 32a and 32b, which are thinner than other portions in second side supporting member 32, and operate about the X direction. Second side supporting member 32 are bent such that the bending directions at X-hinge parts 32a and 32b are opposite directions when OIS movable part 10 moves in the Y direction (see FIGS. 12A and 12B).

With OIS supporting part 30 having the mechanical hinge structure utilizing the elasticity of the elastomer, OIS movable part 10 can be moved with a small force, and accordingly power saving can be achieved. In addition, the parallelism of OIS movable part 10 is ensured, and accordingly the tilt characteristics are improved.

Figure 6:
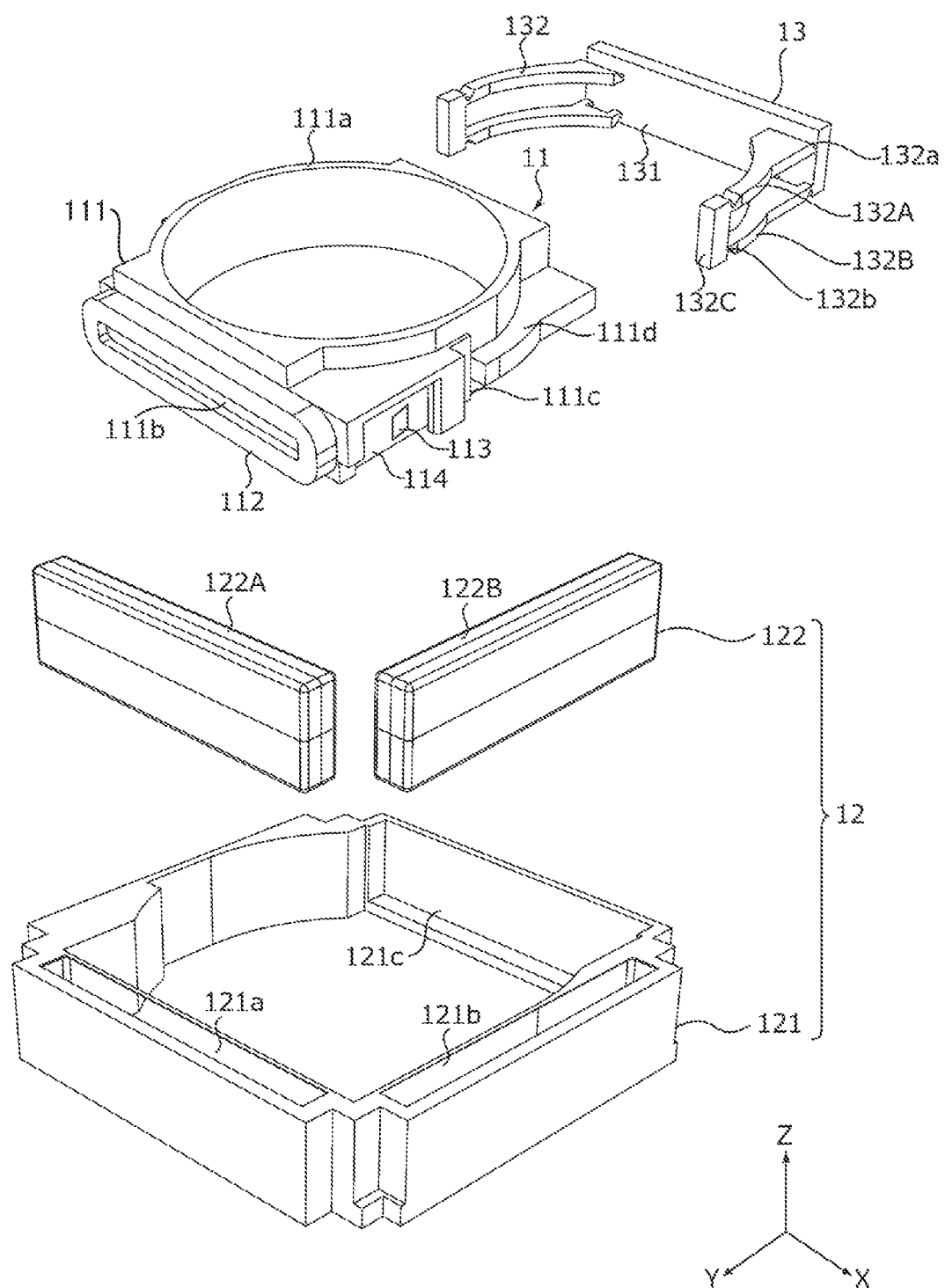
FIG. 6 is an exploded perspective view of an OIS movable part (AF driving part)

FIG. 6 is an exploded perspective view of OIS movable part 10. AF movable part 11 is disposed radially inside AF fixing part 12 and is separated from AF fixing part 12. AF movable part 11 is coupled with AF fixing part 12 by AF supporting part 13.

AF movable part 11 includes an AF coil part serving as a component of an AF voice coil motor, and moves in the light axis direction at the time of focusing. AF fixing part 12 includes an AF magnet part serving as a component of the AF voice coil motor, and supports AF movable part 10 with AF supporting part 13. That is, the AF driving part of lens driving device 1 is of a moving coil type.

AF movable part 11 includes lens holder 111 and AF coil part 112.

Lens holder 111 is a member having a nearly square shape in plan view, and lens part 2 is fixed to lens housing part 111a having a cylindrical shape by bonding or screwing. Lens holder 111 includes coil attaching portion 111b at a side surface along the X direction. Lens holder 111 includes link attaching portions 111c on two side surfaces along the Y direction. Lens holder 111 includes flange 111d that protrudes radially outward at the peripheral surface of lens housing part 111a. In addition, sensor substrate 114 provided with position detection part 113 (for example, a Hall device) for detecting the position of AF movable part 11 in the light axis direction is disposed at one surface along the Y direction of lens holder 111.

AF coil part 112 is an air-core coil that is energized at the time of focusing, and is wound at coil attaching portion 111b of lens holder 111. The both ends of AF coil part 112 are connected with sensor substrate 114. AF coil part 112 has an ellipsoidal shape, and disposed such that the coil surface is parallel with the light axis, and in this case, AF coil part 112 is disposed such that the XZ surface is the coil surface. AF coil part 112 faces magnet part 122 (first magnet 122A).

AF supporting part 13 supports AF movable part 11 with respect to AF fixing part 12. In the present embodiment, as with OIS linking member 30, AF supporting part 13 is composed of a linking member made of an elastomer material (hereinafter referred to as "AF linking member 13"), not a conventional leaf spring. AF linking member 13 is disposed on a side of lens holder 111, and supports lens holder 111 in a cantilever fashion.

AF linking member 30 includes magnet holder fixing part 131 and two arms 132.

Arm 132 has a curved shape along the peripheral surface of lens holder housing part 111a. Each arm 132 includes upper arm 132A and lower arm 132B. The base end parts (fixed ends) of upper arm 132A and lower arm 132B are connected with magnet holder fixing part 131, and are indirectly fixed to AF fixing part 12. Tip end portions (free ends) of upper arm 132A and lower arm 132B are coupled with each other with lens holder fixing part 132C. A flange housing space is defined with upper arm 132A and lower arm 132B.

Upper arm 132A and lower arm 132B have a biaxial hinge structure that is bent about two axes so as to allow AF movable part 11 to translate. With the mechanical hinge structure utilizing the elasticity of the elastomer, AF movable part 11 can be moved with a small force, and accordingly power saving can be achieved.

To be more specific, upper arm 132A and lower arm 132B include hinge parts 132a and 132b which are thinner than other portions in upper arm 132A or lower arm 132B and operate about the X direction. Here, hinge parts 132a and 132b are hinge grooves formed on the external surfaces of upper arm 132A and lower arm 132B. Preferably, the shape of the hinge groove is, but not limited to, an R-shape.

As described above, AF supporting part 13 includes magnet holder fixing part 131 (side wall) that is disposed at auto-focusing fixing part 12 on a side of AF movable part 11, and two arms 132 that couple magnet holder fixing part 131 and AF movable part 11 in a cantilever fashion. Each arm 132 includes hinge parts 132a and 132b which are thinner than other portions in the arm 132 and operate about in the X direction (light axis direction orthogonal to direction), and when AF movable part 11 moves in the light axis direction, arm 132 is bent such that the bending directions at hinge parts 132a and 132b are opposite directions (see FIGS. 13A and 13B). With this configuration, the durability against repetitive bending in auto focusing is improved.

Figures 7A, 7B:
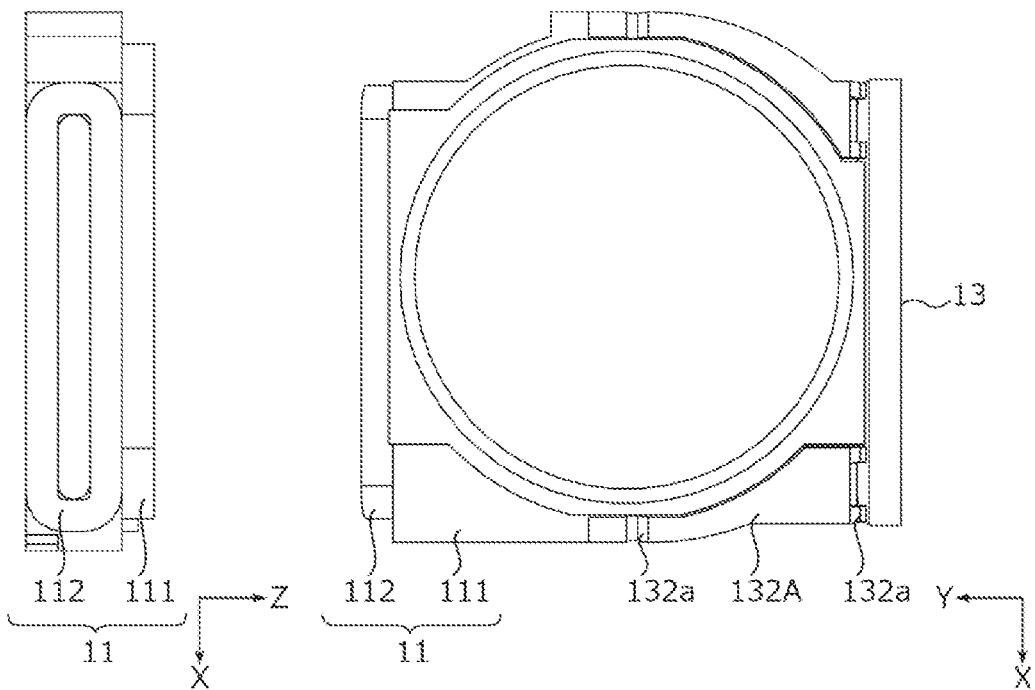
FIGS. 7A to 7C illustrate states where an AF supporting part and an AF movable part are mounted.
Figure 7C:
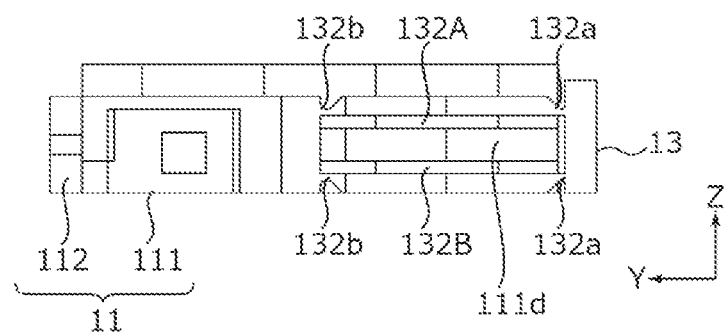

FIGS. 7A to 7C illustrate states where AF supporting part 13 and AF movable part 11 are mounted as viewed from three sides. FIG. 7A is a plan view, FIG. 7B is a left view, and FIG. 7C is a front view. As illustrated in FIGS. 7A to 7C, lens holder 111 is disposed such that flange part 111d is located in a flange housing space of arm 132, and lens holder fixing part 132C of AF linking member 13 is fixed to link attaching portion 111d.

AF linking member 13 is disposed in the proximity of the side surface of lens holder 111, and thus the size of lens driving device 1 in plan view can be reduced, and, AF movable part 11 can be stably supported.

Arm 132 functions as a part for restricting movement of AF movable part 11 in the light axis direction. That is, when AF movable part 11 moves to the light reception side in the light axis direction, the top surface of flange 111d makes contact with upper arm 132A, and thus further movement thereof is restricted. That is, the distance from flange 111d to upper arm 132A is the movable range of AF movable part 11 to the light reception side in the light axis direction. In addition, when AF movable part 11 moves to the imaging side in the light axis direction, the bottom surface of flange 111d makes contact with lower arm 132B, and thus further movement thereof is limited. That is, the distance from flange 111d to lower arm 132B is the movable range of AF movable part 11 to the imaging side in the light axis direction.

As illustrated in FIG. 6, AF fixing part 12 includes magnet holder 121 and magnet part 122.

Magnet part 122 includes first magnet 122A and second magnet 122B. First magnet 122A and second magnet 122B are double-sided quadrupole permanent magnets having cuboid shapes (reference numerals are omitted). That is, in first magnet 122A and second magnet 122B, N pole and S pole equally appear in the six surfaces. First magnet 122A is disposed along the X direction so as to face AF coil part 112. Second magnet 122B is disposed along the Y direction.

The sizes and positions of AF coil part 122 and first magnet 122A are set such that magnetic fields which are opposite to each other in the Y direction traverse two long side portions in AF coil part 112. With this configuration, when AF coil part 122 is energized, Lorentz forces of the same direction in the Z direction are generated at the two long side portions of AF coil part 122.

As described above, first magnet 122A (AF magnet part) has a double-sided quadrupole cuboid shape, and is disposed along the X direction (the first direction orthogonal to the light axis direction). AF coil part 112 has an ellipsoidal shape, and is disposed such that the coil surface faces first magnet 122A and that the magnetic fluxes from first magnet 122A intersecting the two long side portions are in the opposite directions. AF supporting part 13 supports AF movable part 11 on the opposite side of AF coil part 112.

The AF voice coil motor is composed of first magnet 122A and AF coil part 112. In addition, the OIS voice coil motor is composed of first magnet 122A, second magnet 122B and OIS coil part 211 (see FIGS. 11A and 11B). That is, first magnet 122A serves as the AF magnet part and as the OIS magnet part.

First magnet 122A and second magnet 122B are used for detecting the position of OIS movable part 10 in the plane orthogonal to the light axis. In addition, second magnet 122B is used for detecting the position of AF movable part 11 in the light axis direction.

Magnet holder 121 is a rectangular cylinder member having a space for housing AF movable part 11 and having a substantially square shape in plan view. Magnet holder 121 includes magnet housing part 121a at one surface along the X direction, and magnet housing part 121b at one surface along the Y direction. First magnet 122A is disposed in magnet housing part 121a, and second magnet 122B is disposed in magnet housing part 121b.

Magnet holder 121 includes AF link fixing part 121c at the other surface along the X direction. Magnet holder fixing part 131 of AF linking member 13 is fixed to AF link fixing part 121c.

Magnet holder 121 includes OIS link fixing parts 121d at the end portions (four portions) of the two sides along the Y direction. First side supporting members 31 of OIS linking member 30 are fixed at OIS link fixing parts 121d.

Figure 8:
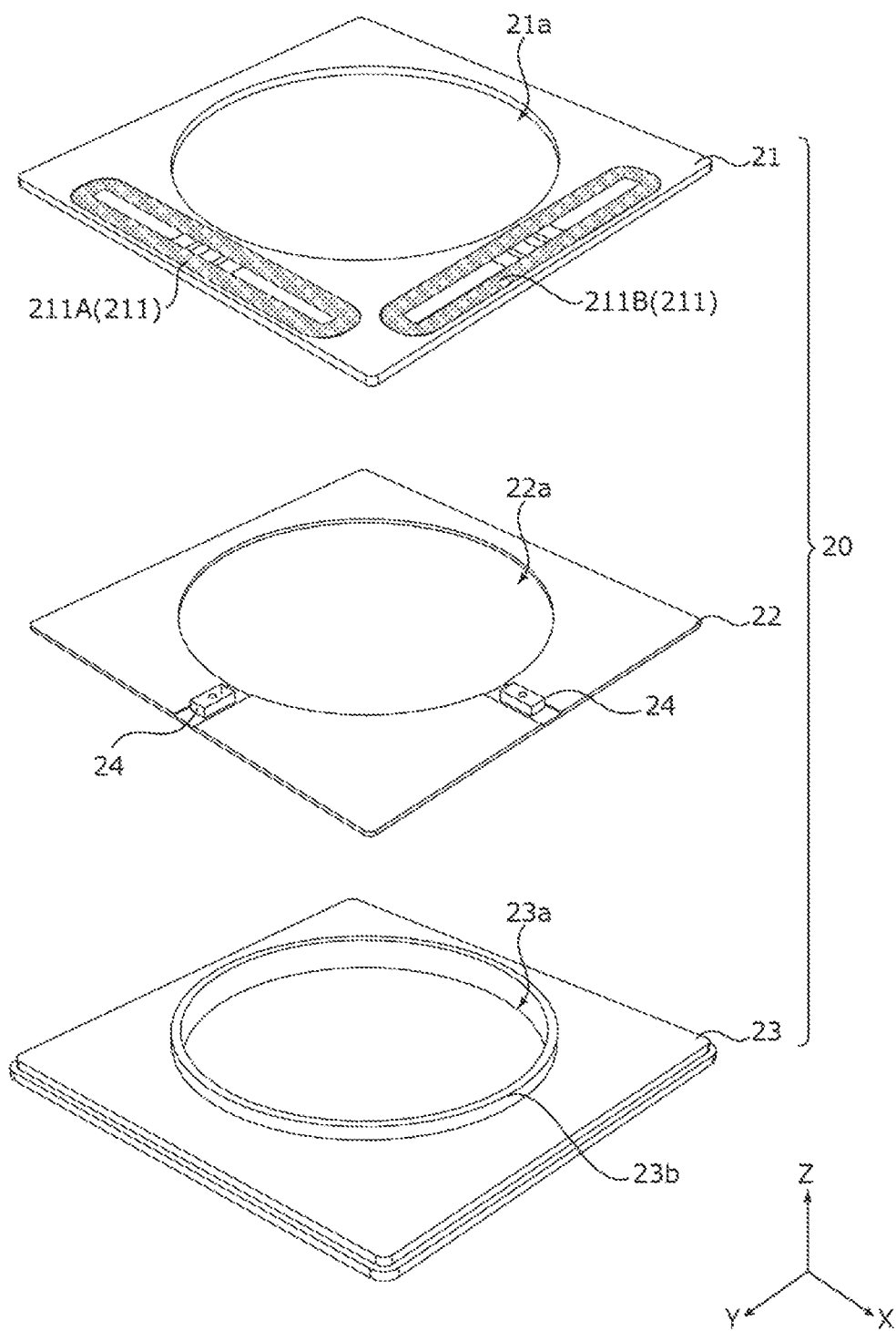
FIG. 8 is an exploded perspective view of an OIS fixing part.

FIG. 8 is an exploded perspective view of OIS fixing part 20. As illustrated in FIG. 8, OIS fixing part 20 includes coil substrate 21, sensor substrate 22, base 23 and the like.

In plan view, coil substrate 21 has a square shape, and has circular opening 21a at a center portion. Coil substrate 21 includes OIS coil part 211 at a position facing magnet part 122 in the light axis direction. OIS coil part 211 includes first OIS coil 211A and second OIS coil 211B corresponding to first magnet 122A and second magnet 122B. First OIS coil 211A has an ellipsoidal shape, and is disposed such that the coil surface thereof faces the imaging side surface of first magnet 122A in the light axis direction and that the magnetic fluxes from first magnet 122A intersecting the two long side portions are in the opposite directions. Second OIS coil 122B has an ellipsoidal shape, and is disposed such that the coil surface thereof faces the imaging side surface of second magnet 122B in the light axis direction and that the magnetic fluxes from second magnet 122B intersecting the two long side portions are in the opposite directions.

The sizes and positions of OIS coil part 211 and magnet part 122 are set such that magnetic fields opposite to each other in the Z direction traverse the two long side portions of each OIS coil 211. With this configuration, when OIS coil part 211 is energized, Lorentz forces in the same direction in the X direction or the Y direction are generated at the two long side portions of OIS coil part 211.

As with coil substrate 21, sensor substrate 22 has a square shape in plan view, and has circular opening 22a at a center portion. Sensor substrate 22 includes a power-source line (not illustrated) for feeding power to AF coil part 112, OIS coil part 211, and position detection part 24, a signal line (not illustrated) for a detection signal output from position detection part 24, and the like.

Position detection parts 24 are mounted on sensor substrate 22. Each position detection part 24 is, for example, a Hall device (hereinafter referred to as "Hall device 24") for detecting a magnetic field by utilizing Hall effect. Hall devices 24 are disposed at approximate centers of adjacent two sides of sensor substrate 22. By detecting the magnetic field mainly formed by magnet part 122 with Hall device 24, the position of OIS movable part 10 in the plane orthogonal to the light axis can be specified. It is to be noted that a position detecting magnet may be disposed independently of magnet part 122 in OIS movable part 10.

As with coil substrate 21, base 23 has a square shape in plan view, and has circular opening 23a at a center portion. Base 23 includes upright wall 23b at the periphery of opening 23a. With upright wall 23b, coil substrate 21 and sensor substrate 22 are positioned with respect to base 23.

Figure 9:
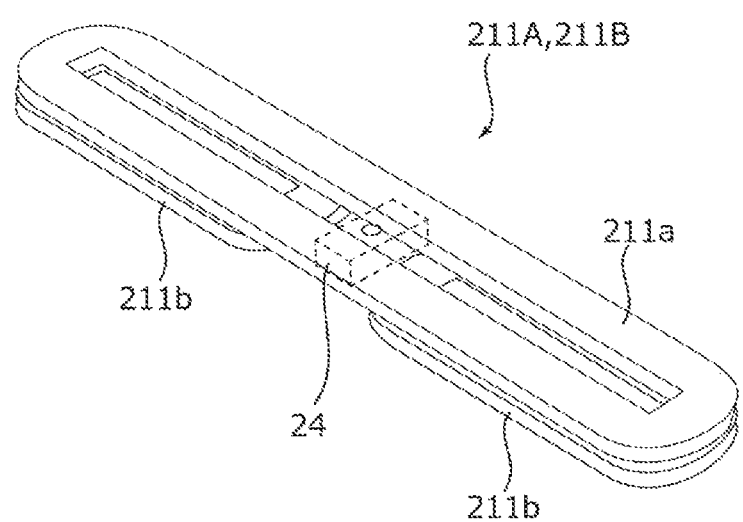
FIG. 9 illustrates an OIS coil part.

Here, as illustrated in FIG. 9, first OIS coil 211A and second OIS coil 211B have a two-layer structure including elliptical upper coil layer 211a (first coil layer) and lower coil layer 211b (second coil layer) obtained by dividing upper coil layer 211a into two parts in the longitudinal direction. Upper coil layer 211a and lower coil layer 211b are formed of, for example, one winding, and the current flow directions thereof are identical. It is to be noted that upper coil layer 211a and lower coil layer 211b may be formed of different windings. In this case, the windings are provided such that the current flow directions thereof are identical. Hall device 24 is disposed at a position corresponding to a portion where lower coil layer 211b is divided. The "position corresponding to a portion where lower coil layer 211b is divided" may not only be a position in the divided part, but also be a position shifted from the divided part in the light axis direction.

Figure 10A:
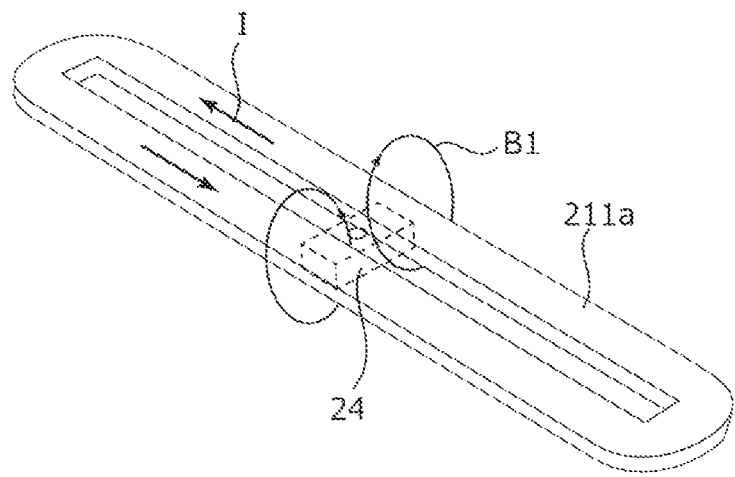
FIGS. 10A and 10B illustrate a relationship between a magnetic flux generated by the OIS coil part and an XY position detection part.
Figure 10B:
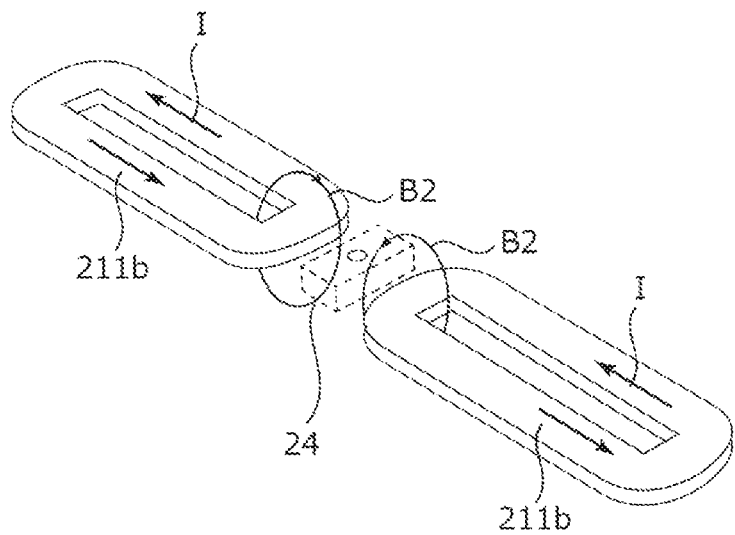

As illustrated in FIGS. 10A and 10B, when current I flows through upper coil layer 211a and lower coil layer 211b in the direction indicated by the arrow, magnetic field B1 generated by upper coil layer 211a traverses Hall device 24 from the lower side to the upper side. Meanwhile, magnetic field B2 generated by lower coil layer 211b traverses Hall device 24 from the upper side to the lower side. Accordingly, the magnetic fields generated by upper coil layer 211a and lower coil layer 211b around Hall device 24 are offset.

With this configuration, at the time of energization of OIS coil part 211, even when a magnetic flux is generated by OIS coil part 211, the magnetic flux that enters Hall device 24 is small, and thus the influence of the magnetic field of OIS coil part 211 on Hall device 24 is suppressed. That is, electrical resonance is suppressed, and further, even when a feedback-control is performed at 150 to 200 Hz, the gain in the low frequency band is improved. Accordingly, the detection sensitivity of Hall device 24 is improved, and the settling time of the OIS driving part is shortened, improving the shake correction accuracy.

In addition, since upper coil layer 211a is not divided, the Lorentz force generated at OIS coil part 211 is large in comparison with a structure in which the entirety of OIS coil part 211 is divided. That is, the sensitivity of shake correction is improved.

In lens driving device 1, when OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction).

Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed. To be more specific, the energization current of shake-correcting coil part 211 is controlled based on a detection signal representing an angular shake from a shake detection part (such as a gyro sensor, not illustrated) so as to offset the angular shake of camera module A. At this time, the translation movement of OIS movable part 10 can be correctly controlled by feeding back the detection result of position detection part 24.

Figure 11A:
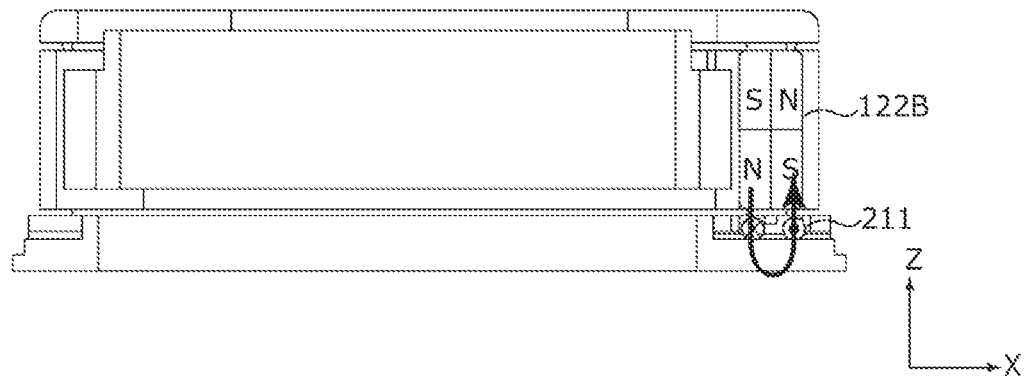
FIGS. 11A and 11B illustrate a bending state of an OIS supporting part (first side supporting member)
Figure 11B:
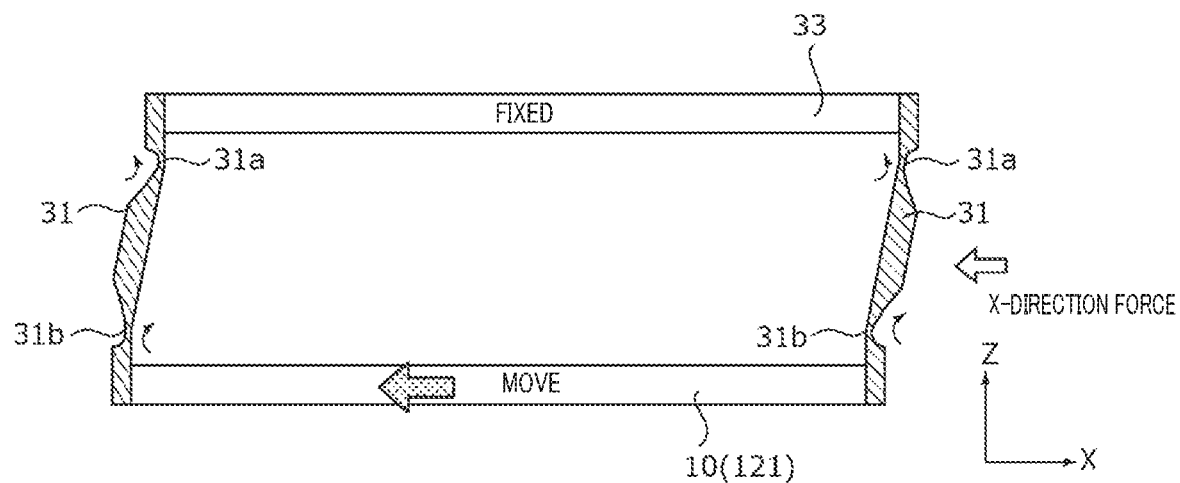

When a force in the X direction acts on OIS movable part 10 as a result of energization of OIS coil part 211 in the manner illustrated in FIG. 11A, first side supporting members 31 of OIS linking member 30 are bent as illustrated in FIG. 11B. Specifically, as illustrated in FIG. 11B, the portion of first side supporting member 31 on the lower side of Y-hinge part 31b moves in the X direction together with OIS movable part 10 (magnet holder 121), while the portion on the upper side of Y-hinge part 31a, which is indirectly connected with OIS fixing part 20 through upper frame body 33 and second side supporting member 32, does not move. That is, first side supporting member 31 is bent such that the bending directions of Y-hinge parts 31a and 31b are opposite directions.

Figure 12A:
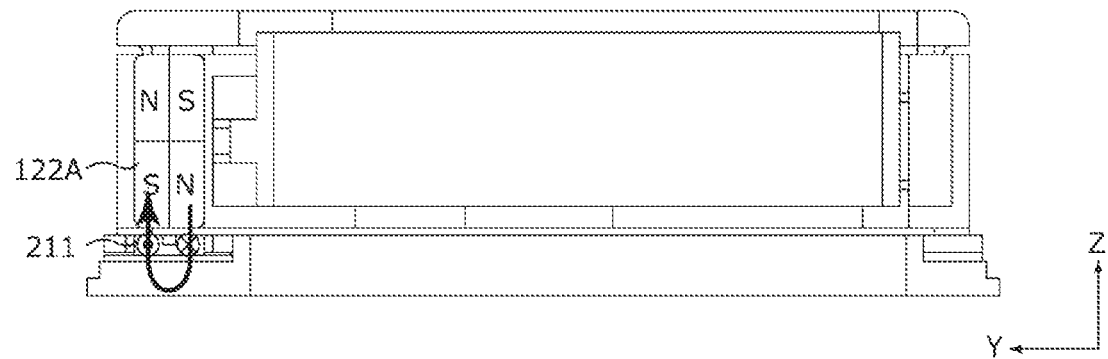
FIGS. 12A and 12B illustrate a bending state of an OIS supporting part (second side supporting member)

On the other hand, when a force in the Y direction acts on OIS movable part 10 as a result of energization of OIS coil part 211 in the manner illustrated in FIG. 12A, second side supporting member 32 of OIS linking member 30 is bent as illustrated in FIG. 11B. Specifically, the portion of second side supporting member 32 on the upper side of X-hinge part 32a moves in the Y direction together with OIS movable part 10 (magnet holder 121), while the portion on the lower side of X-hinge part 32b, which is connected with base 23 of OIS fixing part 20, does not move. That is, second side supporting member 32 is bent such that the bending directions of X-hinge parts 32a and 32b are opposite directions.

In addition, in lens driving device 1, when AF coil part 112 is energized, a Lorentz force is generated at AF coil part 112 by interaction between the magnetic field of first magnet part 122A and the current flowing through AF coil part 112. The direction of the Lorentz force is a direction (the Z direction) orthogonal to the direction of the magnetic field (the Y direction) and to the direction of the current flowing through the AF coil part 112 (the X direction). With this force serving as the driving force of the AF voice coil motor, AF movable part 11 including AF coil part 112 moves in the light axis direction, and thus focusing is performed. The focusing position is adjusted by analyzing multiple pieces of image information acquired by an image capturing part (not illustrated) while moving AF movable part 11, and by conducting a contrast evaluation, for example.

It is to be noted that, in a non-energization state where focusing is not performed, AF movable part 11 is kept suspended between the infinity position and the macro position with AF linking member 13 (hereinafter referred to as "reference state"), for example. That is, in OIS movable part 10, AF movable part 11 (lens holder 111) is supported such that AF movable part 11 is displaceable in the Z direction in the state where the position of AF movable part 11 with respect to AF fixing part 12 (magnet holder 121) is set by AF linking member 13. At the time of focusing, the direction of the current is controlled based on whether AF movable part 11 is moved toward the macro position side or toward the infinity position side from the reference state. In addition, the value of the current is controlled based on the movement length of AF movable part 11.

Figure 13A:
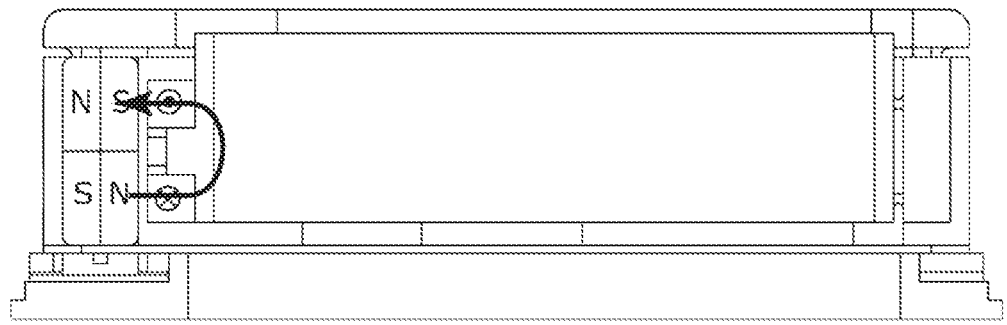
FIGS. 13A and 13B illustrate a bending state of an AF supporting part (arm)
Figure 13B:
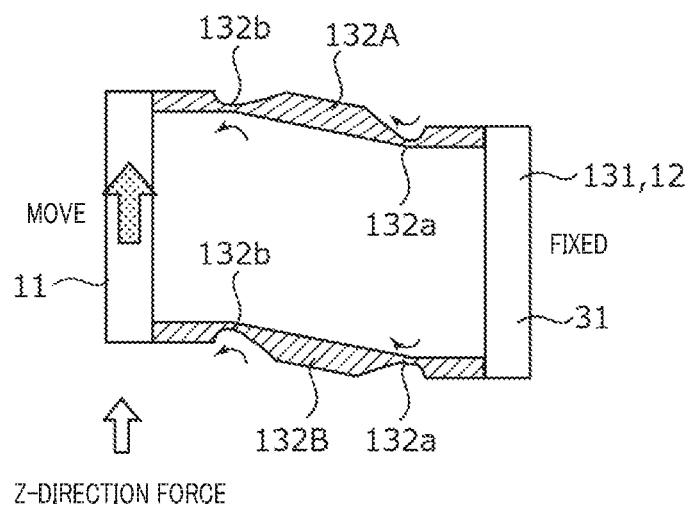

When a force in the Z direction acts on AF movable part 11 as a result of energization of AF coil part 112 in the manner illustrated in FIG. 13A, arm 132 of AF linking member 13 is bent as illustrated in FIG. 13B. Specifically, as illustrated in FIG. 13B, the portion of arm 132 on the left side of hinge part 132b moves in the Z direction together with AF movable part 11, while the portion on the right side of hinge part 132a, which is connected with AF fixing part 12 through magnet holder fixing part 131, does not move. Accordingly, arm 132 is bent such that the bending directions of hinge parts 132a and 132b are opposite directions.

As described above, lens driving device 1 includes a shake-correcting driving part including magnet part 122 (shake-correcting magnet part) disposed at the periphery of lens part 2, OIS coil part 211 (shake-correcting coil part) disposed separately from magnet part 122, and OIS supporting part 30 (shake-correcting supporting part) that supports OIS movable part 10 including magnet part 122 (shake-correcting movable part) such that OIS movable part 10 (shake-correcting movable part) including magnet part 122 is separated from OIS fixing part 20 (shake-correcting fixing part) including OIS coil part 211 in the light axis direction, and the shake-correcting driving part performs shake correction by swaying OIS movable part 10 with respect to OIS fixing part 20 in the plane orthogonal to the light axis direction by use of a driving force a voice coil motor composed of OIS coil part 211 and magnet part 122. OIS movable part 10 includes an auto-focusing driving part including AF coil part 112 (auto-focusing coil part) disposed at the periphery of lens part 2, first magnet 122A (auto-focusing magnet part) disposed separately from AF coil part 112 in the radial direction, and AF supporting part 13 (auto-focusing supporting part) that supports AF movable part 11 (auto-focusing movable part) including AF coil part 112 with respect to AF fixing part 12 (auto-focusing fixing part) including first magnet 122A, and the auto-focusing driving part performs automatic focusing by moving AF movable part 11 in the light axis direction with respect to AF fixing part 12 by use of a driving force of a voice coil motor composed of AF coil part 112 and first magnet 122A. OIS supporting part 30 is made of an elastomer material, and has a biaxial hinge structure for supporting OIS movable part 10 such that OIS movable part 10 is movable in the plane orthogonal to the light axis. AF supporting part 13 is made of an elastomer material, and has a biaxial hinge structure for supporting AF movable part 11 such that is AF movable part 11 is movable in the light axis direction.

With lens driving device 1, the risk of damaging of OIS supporting part 30 and/or AF supporting part 13 due to dropping impact or the like is remarkably low. In addition, in comparison with conventional structures, the structure is simple and the number of the components is small. Accordingly, high reliability can be ensured, and the OIS sensitivity can be increased, while simplifying the assembly work.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, OIS supporting part 30 and AF supporting part 13 are not limited to the support structure illustrated in the embodiment as long as OIS supporting part 30 and AF supporting part 13 are made of an elastomer material and have a biaxial hinge structure.

Figure 14:
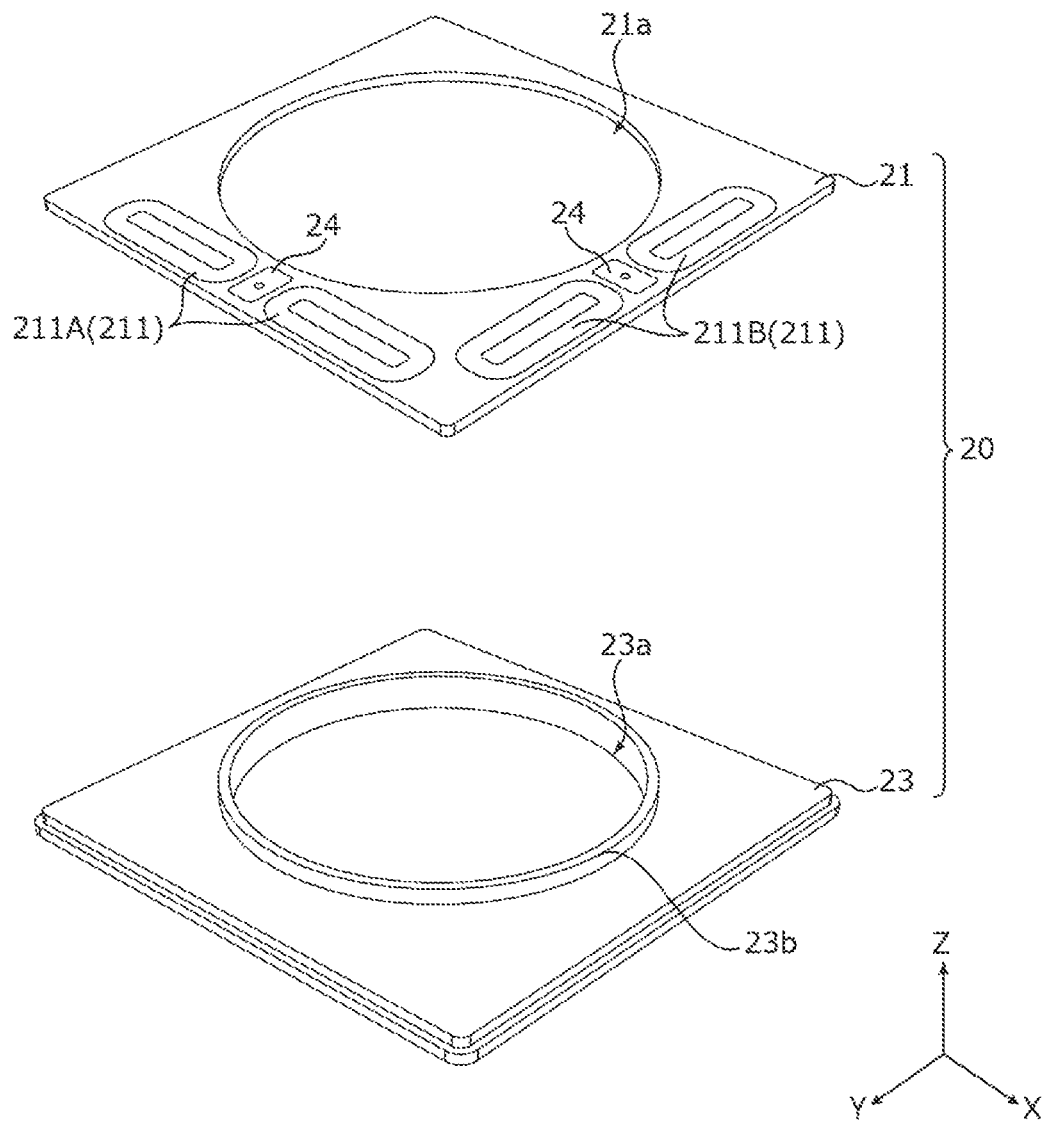
FIG. 14 is an exploded perspective view of an OIS fixing part according of a modification.
Figure 15A:
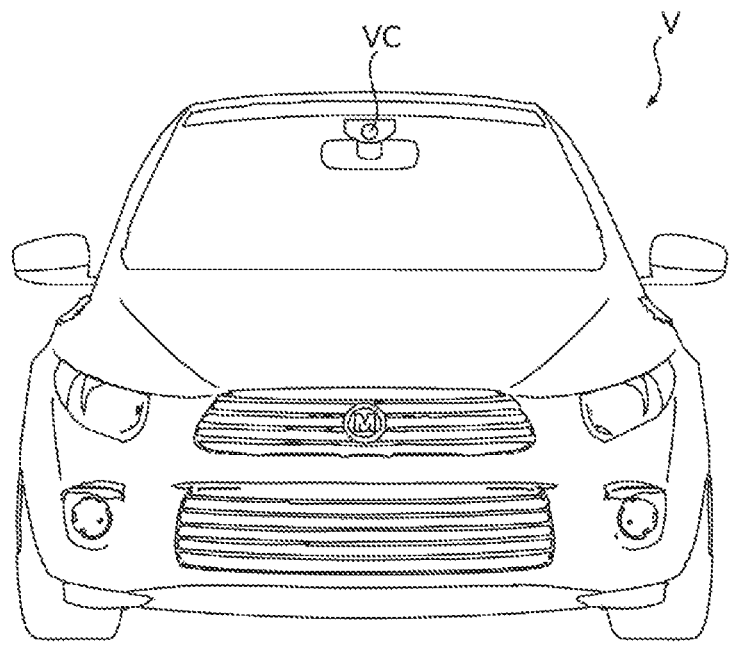
FIGS. 15A and 15B illustrate an automobile as a camera mounting device in which an in-vehicle camera module is mounted.
Figure 15B:
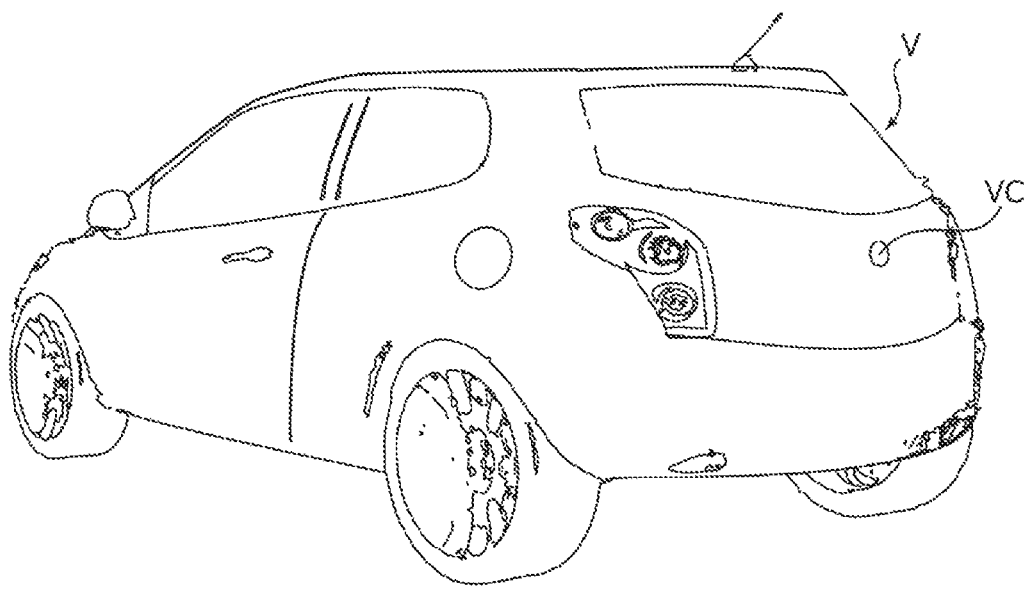

In addition, for example, position detection part 24 for detecting the position of OIS movable part 10 in the plane orthogonal to the light axis may be mounted in coil substrate 21 as illustrated in FIG. 14. In this case, first OIS coil 211A and second OIS coil 211B are divided in the longitudinal direction, and, at the dividing portion, a Hall device is disposed and fixed by molding. Coil substrate 21 includes a power-source line (not illustrated) for feeding power to AF coil part 112, OIS coil part 211, and position detection part 24, a signal line (not illustrated) for a detection signal output from position detection part 24, and the like.

Hall device 24 that is mounted in sensor substrate 22 as in the embodiment is packaged (a so-called hole IC). In contrast, in the example illustrated in FIG. 14, a wiring pattern and a land are formed in coil substrate 21, and Hall device 24 is mounted as a chip, and accordingly, the height can be reduced in comparison with a configuration in which a hole IC is mounted. In addition, when coil substrate 21 has a lamination structure, Hall device 24 can be readily embedded into coil substrate 21, and a complicated wiring pattern can be readily formed.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 12B:
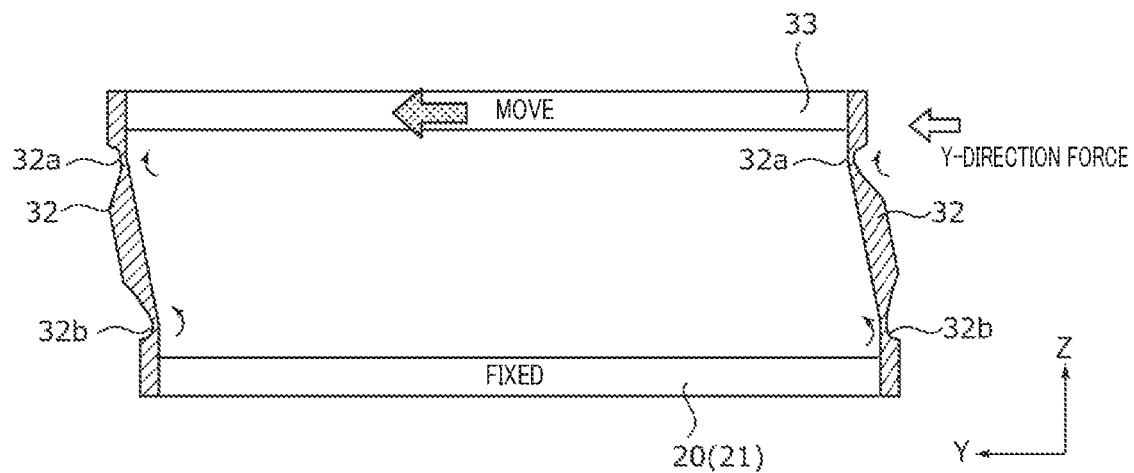

FIGS. 12A and 12B illustrate vehicle V serving as a camera mounting device in which an in-vehicle camera module vehicle camera (VC) is mounted. FIG. 12A is a front view of vehicle V, and FIG. 12B is a rear perspective view of vehicle V. In vehicle V, camera module A described in the embodiment is mounted as in-vehicle camera module VC. As illustrated in FIGS. 12A and 12B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

REFERENCE SIGNS LIST

1 Lens driving device
2 Lens part
3 Cover
10 OIS movable part (shake-correcting movable part)
11 AF movable part (auto-focusing movable part)
111 Lens holder
112 AF coil part (auto-focusing coil part)
12 AF fixing part (auto-focusing fixing part)
121 Magnet holder
122 Magnet part
122A First magnet (auto-focusing magnet part, shake-correcting magnet part)
122B Second magnet (shake-correcting magnet part)
13 AF supporting part, AF linking member (shake-correcting supporting part)
131 Magnet holder fixing part (side wall)
132 Arm
132*a*, 132*b* Hinge part
20 OIS fixing part (shake-correcting fixing part)
21 Coil substrate
211 OIS coil part
211A First OIS coil
211B Second OIS coil
211*a* Upper coil layer (first coil layer)
211*b* Lower coil layer (second coil layer)
22 Sensor substrate
23 Base
24 Position detection part, Hall device
30 OIS supporting part, OIS linking member (shake-correcting supporting part)
31 First side supporting member
31*a*, 31*b* Y-hinge part
32 Second side supporting member
32*a*, 32*b* X-hinge part
33 Upper frame body
A Camera module
M Smartphone (camera mounting apparatus)

The invention claimed is:

1. A lens driving device, comprising: a shake-correcting driving part, the shake-correcting driving part including:
   a shake-correcting magnet part disposed at a periphery of a lens part;
   a shake-correcting coil part disposed separately from the shake-correcting magnet part; and
   a shake-correcting supporting part configured to support a shake-correcting movable part including the shake-correcting magnet part with respect to a shake-correcting fixing part including the shake-correcting coil part in a state where the shake-correcting movable part is separated from the shake-correcting fixing part in a light axis direction,
   wherein the shake-correcting driving part performs shake correction by swaying the shake-correcting movable part with respect to the shake-correcting fixing part in a plane orthogonal to the light axis direction by use of a driving force of a first voice coil motor including the shake-correcting coil part and the shake-correcting magnet part,
   wherein the shake-correcting supporting part is made of a first elastomer material, and has a first biaxial hinge structure for supporting the shake-correcting movable part such that the shake-correcting movable part is movable in the plane orthogonal to the light axis direction, and wherein the shake-correcting movable part includes an auto-focusing driving part, the auto-focusing driving part including:
an auto-focusing magnet part disposed separately from the auto-focusing coil part in a radial direction, and
an auto-focusing supporting part configured to support an auto-focusing movable part including the auto-focusing coil part with respect to an auto-focusing fixing part including the auto-focusing magnet part,
wherein the auto-focusing driving part performs automatic focusing by moving the auto-focusing movable part in the light axis direction with respect to the auto-focusing fixing part by use of a driving force of a second voice coil motor including the auto-focusing coil part and the auto-focusing magnet part, and
wherein the auto-focusing supporting part is made of a second elastomer material, and has a second biaxial hinge structure for supporting the auto-focusing movable part such that the auto-focusing movable part is movable in the light axis direction.

2. The lens driving device according to claim 1,
wherein the shake-correcting supporting part includes:
an upper frame body disposed opposite to the shake-correcting fixing part in the light axis direction,
first side supporting members disposed opposite to each other in a first direction orthogonal to the light axis direction, each of the first side supporting members coupling the upper frame body and the shake-correcting movable part, and
second side supporting members disposed opposite to each other in a second direction orthogonal to the light axis direction and the first direction, each of the second side supporting members coupling the upper frame body and the shake-correcting fixing part;
wherein each of the first side supporting members includes two Y-hinge parts which are thinner than other portions in the each of the first side supporting members and are configured to operate about the second direction, the each of the first side supporting members being configured to be bent such that bending directions at the two Y-hinge parts are opposite directions when the shake-correcting movable part moves in the first direction; and
wherein each of the second side supporting members includes two X-hinge parts which are thinner than other portions in the each of the second side supporting members and are configured to operate about the first direction, the each of the second side supporting members being configured to be bent such that bending directions at the two X-hinge parts are opposite directions when the shake-correcting movable part moves in the second direction.

3. The lens driving device according to claim 2, wherein the first side supporting members and the second side supporting members are columnar members suspended from the upper frame body.

4. The lens driving device according to claim 3,
wherein the upper frame body has a rectangular shape in plan view;
wherein the first side supporting members are formed at end portions of two sides of the upper frame body, the two sides being opposite to each other in the first direction; and
wherein the second side supporting members are formed at end portions of the other two sides of the upper frame body, the other two sides being opposite to each other in the second direction.

5. The lens driving device according to claim 1,
wherein the auto-focusing supporting part includes:
a side wall disposed at the auto-focusing fixing part on a side of the auto-focusing movable part, and
two arms configured to couple the side wall and the auto-focusing movable part in a cantilever fashion; and
wherein each of the two arms includes two hinge parts which are thinner than other portions in the each of the two arms and are configured to operate about a direction orthogonal to the light axis direction, the each of the two arms being configured to be bent such that bending directions at the two hinge parts are opposite directions when the auto-focusing movable part moves in the light axis direction.

6. The lens driving device according to claim 1,
wherein the auto-focusing magnet part has a double-sided quadrupole cuboid shape, and is disposed along a first direction orthogonal to the light axis direction;
wherein the auto-focusing coil part has an ellipsoidal shape, and is disposed such that a coil surface of the auto-focusing coil part is opposite to the auto-focusing magnet part and that magnetic fluxes from the auto-focusing magnet intersecting two long side portions of the auto-focusing coil part are in opposite directions; and
wherein the auto-focusing supporting part supports the auto-focusing movable part on a side opposite to the auto-focusing coil part.

7. The lens driving device according to claim 6,
wherein the shake-correcting magnet part includes:
a first shake correction magnet including the auto-focusing magnet part, and
a second shake correction magnet having a structure similar to a structure of the first shake correction magnet, and disposed along a second direction orthogonal to the light axis direction and the first direction;
wherein the shake-correcting coil part includes a first shake correction coil and a second shake correction coil corresponding to the first shake correction magnet and the second shake correction magnet;
wherein the first shake correction coil has an ellipsoidal shape, and is disposed such that a coil surface of the first shake correction coil is opposite to a surface of the first shake correction magnet on an imaging side in the light axis direction and that magnetic fluxes from the auto-focusing magnet intersecting two long side portions of the first shake correction coil are in opposite directions; and
wherein the second shake correction coil has an ellipsoidal shape, and is disposed such that a coil surface of the second shake correction coil is opposite to a surface of the second shake correction magnet on the imaging side in the light axis direction and that magnetic fluxes from the auto-focusing magnet intersecting two long side portions of the second shake correction coil are in opposite directions.

8. A camera module, comprising:
the lens part; and
the lens driving device according to claim 1.

9. A camera mounting apparatus that is an information apparatus or a transport apparatus, wherein the camera mounting apparatus comprises the camera module according to claim 8.

* * * * *